(12) United States Patent
Thomas

(10) Patent No.: US 8,250,970 B2
(45) Date of Patent: Aug. 28, 2012

(54) SUBSTANCE HOLDER WITH REMOVABLE INSERT

(75) Inventor: William Thomas, Pawnee, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 583 days.

(21) Appl. No.: 11/140,673

(22) Filed: May 27, 2005

(65) Prior Publication Data

US 2006/0150823 A1 Jul. 13, 2006

Related U.S. Application Data

(60) Provisional application No. 60/575,235, filed on May 28, 2004.

(51) Int. Cl.
*A47J 31/24* (2006.01)

(52) U.S. Cl. ........................ 99/289 R; 99/295; 99/302 R

(58) Field of Classification Search ..................... 99/295, 99/302 R, 306, 323, 289 R
See application file for complete search history.

(56) References Cited

U.S. PATENT DOCUMENTS

| | | | |
|---|---|---|---|
| 2,899,886 A | 8/1959 | Rodth | |
| 3,209,676 A * | 10/1965 | Zimmermann et al. | 99/289 R |
| 3,413,909 A | 12/1968 | Heier | |
| 3,552,976 A | 1/1971 | King | |
| 3,590,724 A | 7/1971 | Lorang | |
| 3,618,510 A * | 11/1971 | Varney | 99/302 R |
| 3,620,155 A | 11/1971 | Bixby, Jr. | |
| 3,935,318 A | 1/1976 | Mihailide | |
| 3,948,157 A | 4/1976 | Layre | |
| 4,143,589 A * | 3/1979 | Weber | 99/282 |
| 4,381,696 A * | 5/1983 | Koral | 99/304 |
| 4,602,558 A | 7/1986 | Kaper et al. | |
| 4,986,172 A | 1/1991 | Hunnicutt, Jr. | |
| 4,997,015 A | 3/1991 | Johnson | |
| 5,063,837 A | 11/1991 | Precht | |
| 5,190,652 A | 3/1993 | Van Thoor et al. | |
| 5,197,374 A | 3/1993 | Fond | |
| 5,287,797 A | 2/1994 | Grykiewicz et al. | |
| 5,312,637 A | 5/1994 | Midden | |
| 5,347,916 A | 9/1994 | Fond et al. | |
| 5,485,778 A | 1/1996 | Ullman | |
| 5,649,472 A | 7/1997 | Fond et al. | |
| 5,855,160 A | 1/1999 | Shen | |
| 5,947,004 A | 9/1999 | Huang | |
| 5,992,298 A | 11/1999 | Illy et al. | |
| 6,021,705 A | 2/2000 | Dijs | |
| 6,076,450 A | 6/2000 | DiGiorgio, Jr. | |
| 6,103,116 A * | 8/2000 | Koslow et al. | 210/282 |

(Continued)

FOREIGN PATENT DOCUMENTS

NL 1007171 9/1997

(Continued)

*Primary Examiner* — Reginald L Alexander
(74) *Attorney, Agent, or Firm* — Barnes & Thornburg LLP

(57) ABSTRACT

A substance holder and an insert for use in the substance holder. The insert elevates a brewing substance, filter or pod above a floor of the substance holder. The substance holder and insert allow water to infuse the brewing substance and allow beverage to drain through a portion of the insert for draining into a container. The insert is retained in the holder and is selectively removable from the holder to facilitate actions, for example but not limited to cleaning of the holder and insert as well as replacing the insert with other structures which may be used with the holder.

21 Claims, 8 Drawing Sheets

U.S. PATENT DOCUMENTS

| | | |
|---|---|---|
| 6,164,191 A | 12/2000 | Liu et al. |
| 6,189,438 B1 | 2/2001 | Biefeldt et al. |
| 6,224,755 B1 | 5/2001 | Schamberg et al. |
| 6,244,162 B1 | 6/2001 | Dahmen |
| 6,345,570 B1 | 2/2002 | Santi |
| 6,488,976 B1 | 12/2002 | Priley |
| 6,606,938 B2 | 8/2003 | Taylor |
| 6,607,762 B2 | 8/2003 | Lazaris et al. |
| 6,655,260 B2 | 12/2003 | Lazaris et al. |
| 6,658,989 B2 | 12/2003 | Sweeney et al. |
| 6,742,442 B1 * | 6/2004 | Su .................................. 99/281 |
| 758,130 A1 | 7/2004 | Sargent et al. |
| 6,777,007 B2 | 8/2004 | Cai |
| 6,832,542 B2 | 12/2004 | Hu et al. |

FOREIGN PATENT DOCUMENTS

| | | |
|---|---|---|
| WO | WO 94/02059 | 2/1994 |

* cited by examiner

SUBSTANCE HOLDER WITH REMOVABLE INSERT

CROSS-REFERENCE TO RELATED PATENT APPLICATION

This patent application claims the benefit of U.S. Provisional Patent Application No. 60/575,235, filed May 28, 2004. The disclosures set forth in the referenced provisional application are incorporated herein by reference in their entirety, including all information as originally submitted to the Untied States Patent and Trademark Office.

BACKGROUND

A variety of brewing apparatus have been developed to combine heated water with a brewing substance such as ground coffee or tea material to infuse the material and produce a brewed beverage. There are many ways to combine the water with the brewing substance. One way is to place the substance in a filter device such as a disposable filter paper and place the filter paper and brewing substance in a brewing funnel or basket. The water is mixed with the brewing substance in the filter thereby allowing the brewed substance to filter through the paper leaving the saturated brewing substance in the filter paper. The saturated substance and used filter paper can be thrown away at the end of the brewing process.

Another way of brewing beverage is to encapsulate the brewing substance in a filter material or structure. The brewing substance in the filter material provides a convenient package for handling a predetermined quantity of brewing substance. The filter material provides a package or container for the brewing substance. This package allows the brewing substance to be handled prior to brewing and after brewing with reduced complication and mess.

Such brewing substances pre-packaged in filter material are referred to as "pods" or "sachets." Pods can be compressed while packaging in the filter material or left in a generally loose condition. Pods are generally shaped in a circular shape having a generally flattened configuration. The pods often are provided in the shape of a disc or puck. Pods generally range in a size from approximately 45-60 mm and contain approximately 9-10 grams of brewing substance. The typical pod is used to produce approximately 8 ounces of brewed beverage. A variety of reusable containers may be used for providing similar or the same substance containment benefits of the pod configuration using a disposable filter material.

It is desirable to improve the flavor and extraction of the flavors and other components of the coffee or other brewing substances. When brewing a beverage it is desirable to saturate, penetrate, agitate and otherwise engage all of the particles of the brewing substance so as to thoroughly wash from the brewing substance all or at least a suitable portion of the desirable flavor characteristics and substances for incorporation into the brewed beverage to achieve the desired beverage flavor results.

DESCRIPTION OF THE DRAWINGS

The organization and manner of the structure and function of the invention, together with the further objects and advantages thereof, may be understood by reference to the following description taken in connection with the accompanying drawings, and in which.

DETAILED DESCRIPTION

Figure 1:
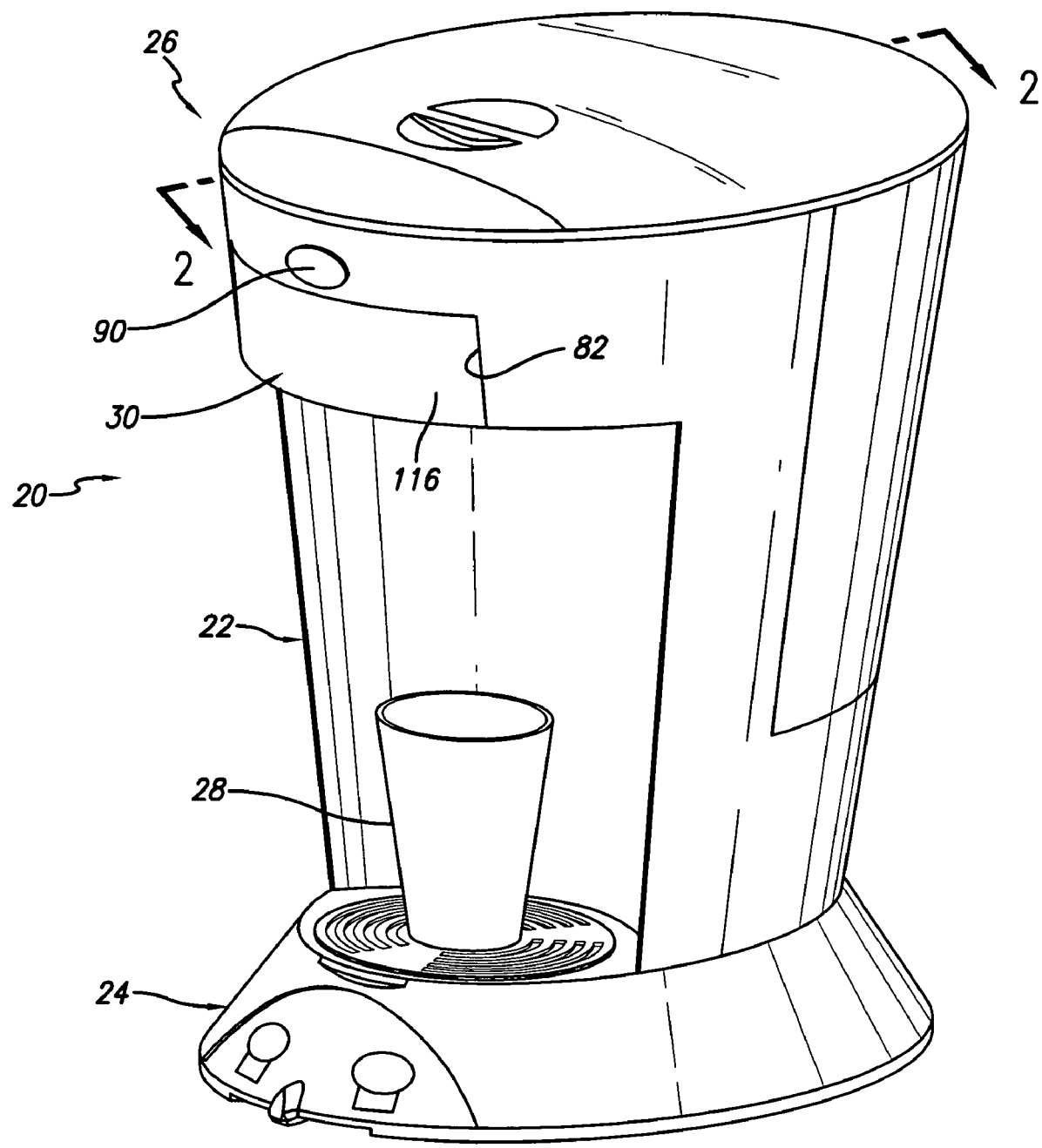
FIG. 1 is a perspective view of an embodiment of a brewer for use with a pod holder of the type which is displaceable relative to a housing of the brewer.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

As shown in FIG. 1, a beverage maker such as, by way of example and not limitation, a single-serving or small serving brewer 20 as illustrated. The beverage maker or brewer 20 includes a body 22, a base 24 and an upper portion 26. The upper portion 26 is configured to be positioned above a container such as a cup 28 for dispensing a brewed beverage into the cup 28. It should be noted that many different configurations of a single-serving brewer 20 may be produced. However, all forms of beverage makers 20 that may require the use of some form of substance holder 38 (see FIG. 2) which is releasably associated with the brewer 20 is included in this disclosure. The term beverage maker is to be broadly interpreted to include any form of maker with which the holder as disclosed herein will work.

Terms including beverage, beverage making and brewing as used herein are intended to be broadly defined as including but not limited to the brewing of coffee, tea, herbs and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, herbs, liquid beverage concentrate, powdered beverage concentrate, freeze dried coffee or other beverage concentrates, to obtain a desired beverage or other food.

While the term "pod" is used herein to described one form of substance holder, it is contemplated that any form of beverage brewing substance container that substantially contains the brewing substance while allowing brewing substance selection, may be used. It is further contemplated that the pod or container described herein could utilize other concentrates such as freeze dried concentrates, gel, liquid, powder or any other form of concentrate which will operate with the disclosed structures and methods as well as equivalents thereof and any modifications which might be required to modify the disclosed structures and method to be used with such other substances, if necessary.

Figure 2:
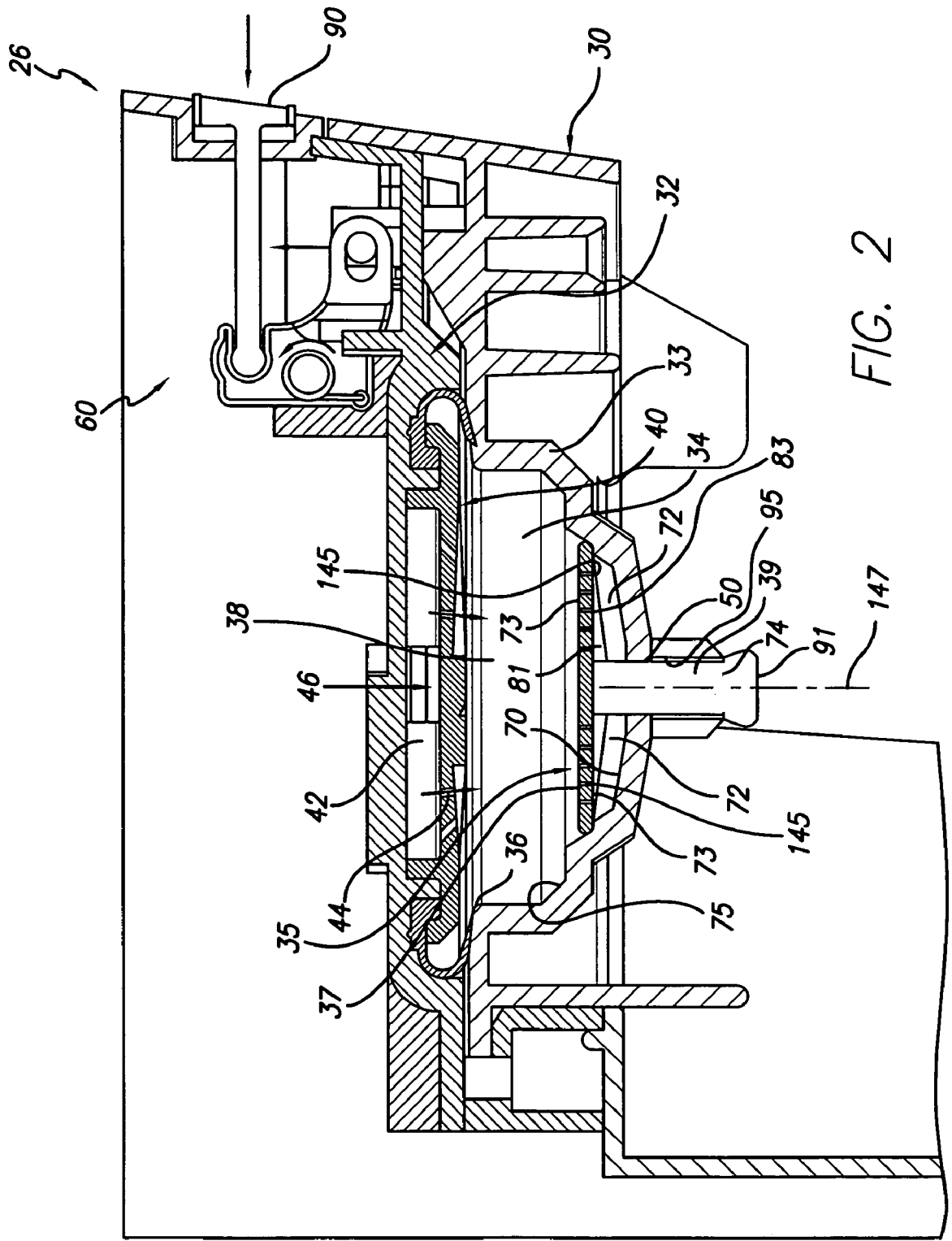
FIG. 2 is a partial fragmentary side elevational view of a cross-section of the holder taken along line 2-2 in FIG. 1.

FIG. 2 provides a cross-sectional view of the upper portion 26 of the brewer 20 taken along line 2-2 in FIG. 1. In FIG. 2, the holder 30 is shown attached to a mounting portion 32 of the upper portion 26. The holder as shown has a drawer-like configuration adapted to retain a pod in a predetermined position in the brewer 20. In FIG. 2, a pod is not provided in the holder 30 in the interest of clarity in describing the components and structures thereof. The holder 30 includes a wall 33 which, at least in part, defines a cavity 34. In further reference to FIG. 3, the wall 33 defines an upper rim 36. The upper rim 36 defines an entry opening 38 through which a pod or other brewing substance or holder is placed. The pod, container or loose brewing substance without a container or pod is placed in the cavity 34 for brewing. Although the holder 30 is shown as having a drawer-like configuration, it is contemplated that other suitable configurations may be devised for holding a portion of brewing substance, such as a pod, to retain the pod during a brewing cycle.

Figure 6:
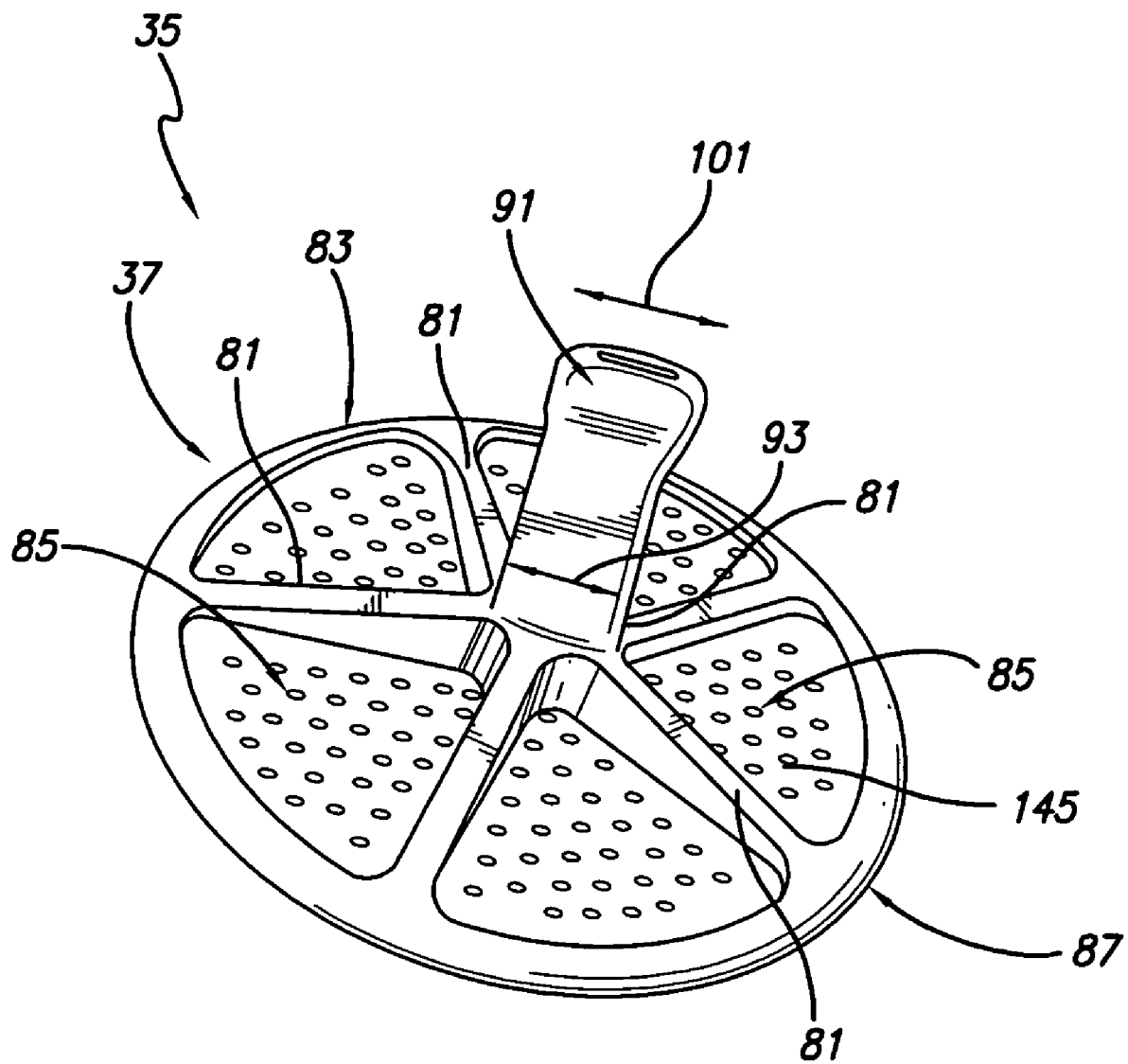
FIG. 6 is a bottom perspective view of an insert removed from the holder.

In further describing the holder, a floor 70 is provided in a lower portion of the holder. The floor extends downwardly from the wall 33 towards a drain 74. The drain 74 is defined by a drain wall 73 extending from the floor 70. A pod holder 35 is positioned in the cavity 34 having an upper portion 37 and an extension, blade or finger 39. The cavity 34 communicates with the drain 74. The drain provides a path through which beverage brewed in the cavity 34 is allowed to drain and, as a result, be dispensed from the brewer. The pod holder insert 35 is adapted to retain a pod above the floor 70 of the pod holder 30. With reference to FIG. 6, a series of arms or braces 81 are provided on an underside 83 of the insert 35. Opening areas 85, described below, are provided between the arms 81.

Figure 4:
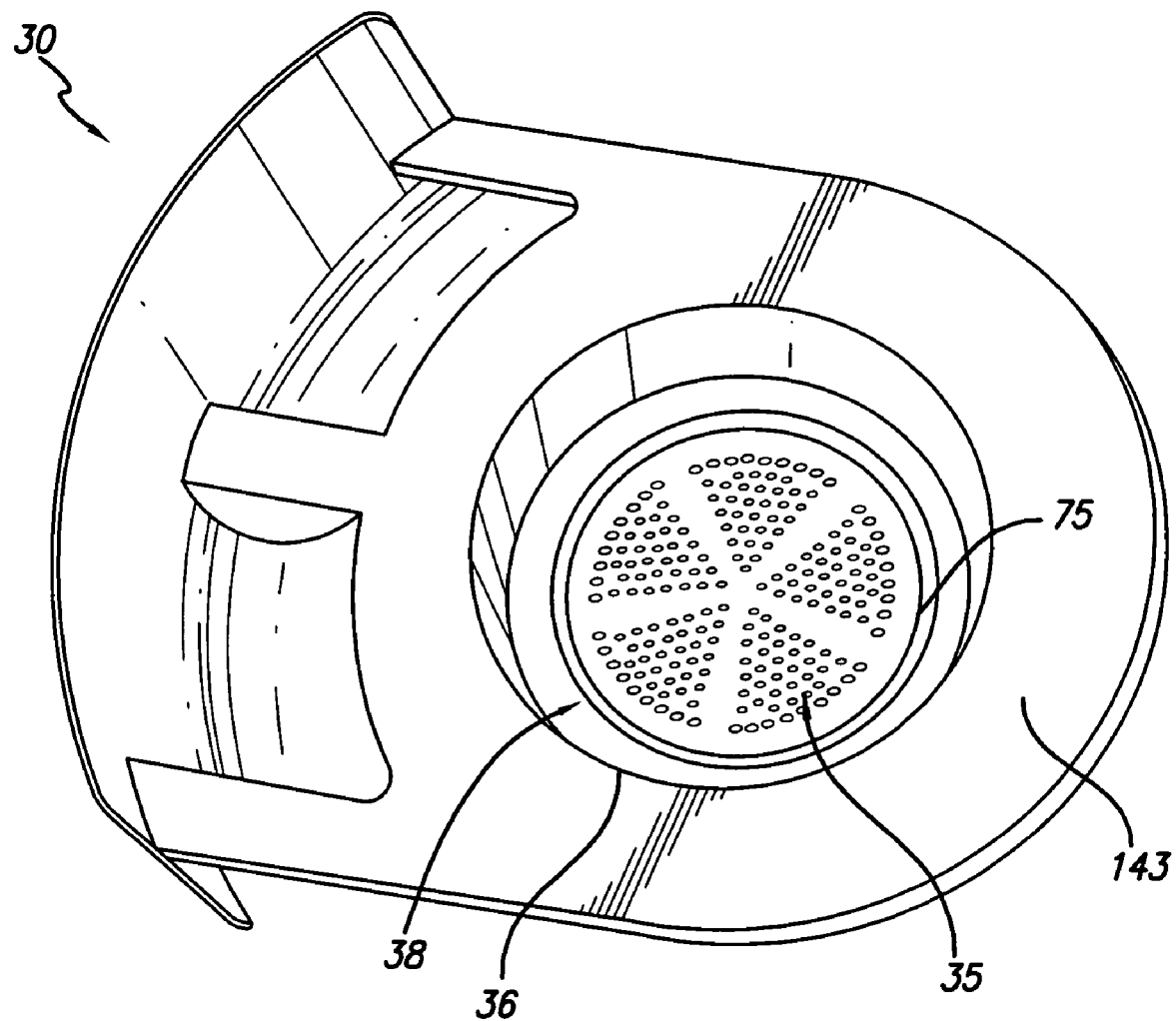
FIG. 4 is a top perspective view of the holder removed from the brewer similar to that as shown in FIG. 3.
Figure 5:
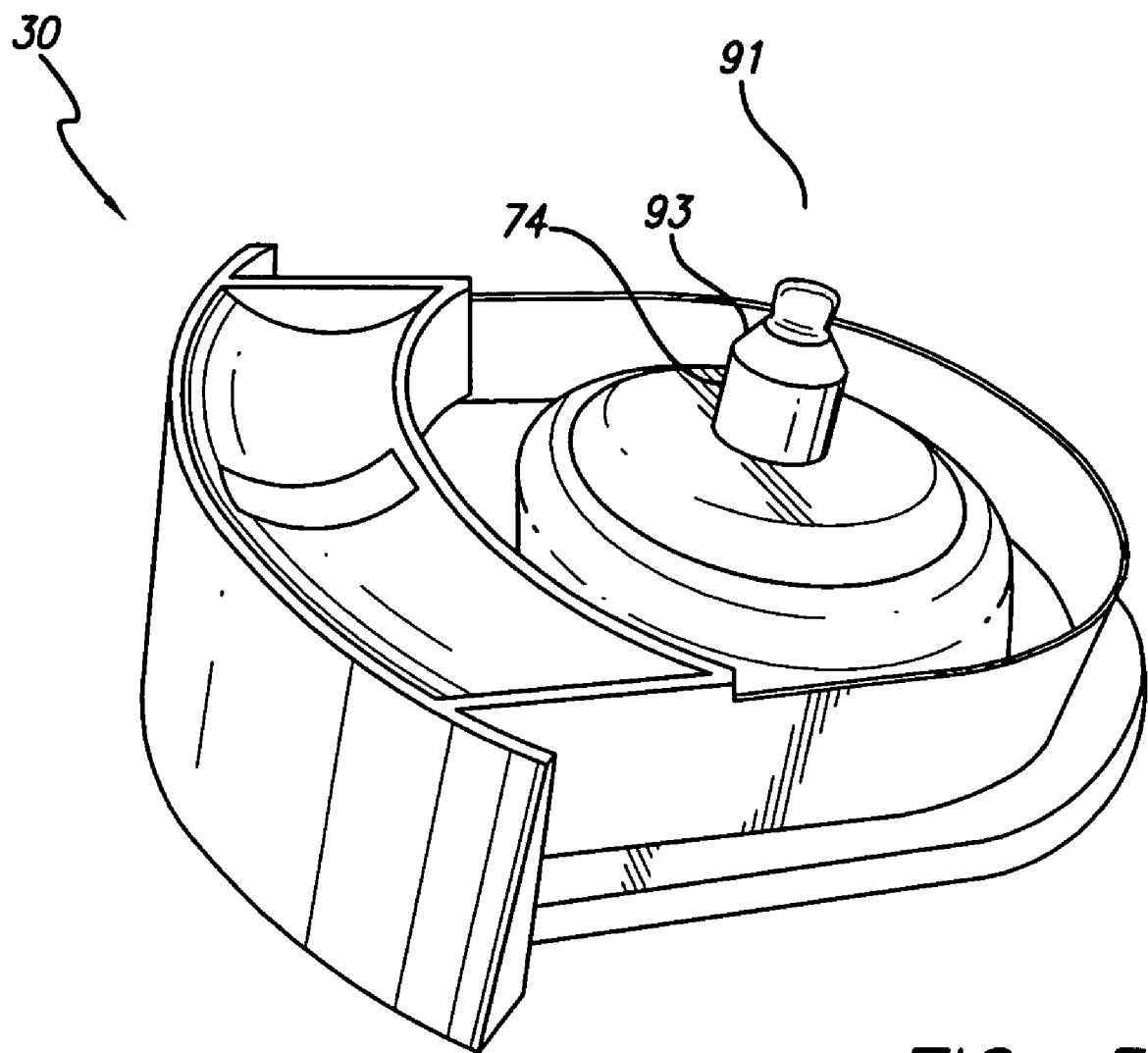
FIG. 5 is a bottom perspective view of the holder with a tip of an insert extending through a drain hole of the drawer.

As shown in the bottom view of FIG. 6, the insert 35 is generally circular. While a circular shape is shown it is fully within the scope of this description to provide an insert having other shapes and the present disclosure is not limited to a circular shape. With reference to FIGS. 4 and 6, an outer circumference 81 of the upper portion 37 of the insert 35 generally abuts an inner surface or edge 75 of the wall 33 defining the cavity 34. The blade 39 extends downwardly away from the upper portion 37 through the drain 74. With reference to FIG. 5, a protruding end 91 of the blade 39 extends through a rim 93 of the drain 74.

As shown in FIG. 6, the embodiment of the blade 39 has a generally elongated or enlarged cross-sectional dimension 93. This elongated dimension 93 generally extends proximate to an internal surface of the wall 95 of the drain. The elongated dimension 93 of the blade tends to help columnate or otherwise create a laminating flow of the beverage passing through the drain 74. This directed flow helps to reduce splashing as the flow is dispersed into a cup 28. It is envisioned that other forms of the extension 39 may be produced which may not create a laminating flow, and in fact could create a mixing effect, no effect or some other effect or combination of effects. The extension 39 or any other device also may take any number of other forms that help retain the inset 37 relative to the holder 30 to support the pod, container or loose coffee above the floor yet facilitate removability of the insert relative to the holder for cleaning.

In the embodiment shown in the figures, the end 91 has a dimension 101 which is greater than the dimension 93. This results in some degree of interference fit between the rim 93 of the drain 74 and the tip 91. It is useful to provide some structure or method of retaining the insert 35 in the cavity 34 to prevent accidental or unintended displacement or loss.

The structures disclosed for retaining the insert also allow for selective removal of the insert from the holder for a variety of reasons, including but not limited to cleaning of the insert and holder with the insert removed, as well as removal of the insert for installation of another type of structure. For example another type of structure may be installed once the insert is removed. For example, an insert which raises the upper portion 37 in the cavity or changes the shape of the surface defined by the upper portion 37 may be installed in the holder. Also, the inset may be removed to install a different insert having a different structure. For example, the upper portion of the insert shown has holes. This design is suitable for use with a pod but may not be suitable for use with loose brewing substance such as loose coffee or tea. Further, the loose coffee insert may be different that the loose tea insert such that the coffee may use a smaller opening or mesh compared to the tea. This may be because the tea may have a larger grain or leaf size compared to ground coffee which may have a much smaller grain size. These examples are provided to help illustrate the breadth of this disclosure and not to limit the disclosure.

In use, the holder is extracted from the brewer. The insert 35, if not already in place, is inserted with the blade 94 extending into the drain 74. The insert 35 is retained with the tip 91 extended beyond the rim 93 of the drain 74. A pod can then be placed in the cavity 34 on top of the upper portion 37 of the insert 35. The pod holder 30 with the insert 35 in place and the pod retained in the cavity 34 can then be positioned in the brewer.

When removing the spent pod from the holder, there may be some retention of the pod as a result of the pod being wet and, possibly, forced into contact with the wall 33 during the brewing process. For example, the pod may become forced into the wall as a result of the water pressure or forces acting on the pod pushing it downwardly against the holder insert 35. In this situation, the user may tend to knock the drawer upside down with the generally planar surface 143 of the drawer 30 abutting an edge surface such as the edge of a garbage can or countertop. Such action may tend to cause the pod to dislodge from the cavity 34. This use of the drawer 30 should be understood in the context of the insert 35 as illustrated such that the insert 35 has been designed to generally resist disengagement under such circumstances. In other words, the holding force of the end 91 may be configured so as to resist these conditions.

With the foregoing in mind, the insert 35 can be configured to be removable to facilitate cleaning of the internal surfaces of the cavity, including the insert, as well as, for replacement with other structures. In this regard, application of a force against the end 91 inwardly and generally axially along a central axis 147 the drain 74 is generally sufficient to disengage the end 91 from the rim. The force may be enhanced by the use of an implement such as a probe, or by merely forcing the end against a countertop or other flat surface. The application of the force will cause the end 91 to slide past the edge of the drain.

In one embodiment, as illustrated, the internal surfaces 95 of the drain 74 are beveled outwardly toward the mouth 38. This beveling or angling of the surface 95 facilitates engagement of the end 91 and disengagement of the end 91. In other words, when positioning the insert 35 in the holder, the end 91 generally is engaged only at the rim of the holder. While it is being inserted through the throat of the drain 74, there is generally little or reduced engagement, thereby facilitating positioning the end 91 beyond the rim to help facilitate retention of the insert 35 in the cavity 34. The material used for the blade and holder, especially in the area of the drain, may provide some degree of "give" or compression to allow engagement of the blade in the drain.

The insert also includes the open areas 85. The open areas 85 include a field of apertures or holes 145. The field of holes is generally vertically aligned with the central axis 147 of the drain 74 and flow laminator 39. The holes 145 defined in the open areas 85 therefore generally drain vertically downward through the cavity 34 into a lower area 72 and onto the floor 70.

As shown in the figures, the insert 35 is adapted to retain the pod above the floor 70 of the holder 30. Although the insert is shown to be generally integrally formed of a single piece of material, other configurations involving one or more materials could be devised. For example, the open areas 85 including the holes 145 could formed of a mesh or other material which is molded with, attached to, or overmolded by the material, such as plastic, which forms the braces 81 and blade 39. The holes 145 may be elongated slots, or holes of any shape compatible with the brewing process. It is envisioned that the materials and structures of the insert 35 will be broadly interpreted based on the general concepts and examples provided herein. Examples are provided to illustrate the structure and function of the apparatus and method and are not intended to limit the scope of protection associated with this disclosure.

The drain 74 is positioned in the lower portion of the floor 70 to facilitate draining of the liquid, such as coffee or tea, from the cavity. A pod placed in the cavity 34 will receive water in an upper portion of the pod positioned in close proximity of the entry opening 38. Water flowing through the pod and infusing the substance will drain under pressure, suction, gravity or some degree of a combination of these forces through the openings 145, along to open area 76 into a lower portion of the cavity and toward the drain 74. Brewed beverage will drain from the pod holder into the lower portion of the cavity and through the drain hole 74.

Figure 3:
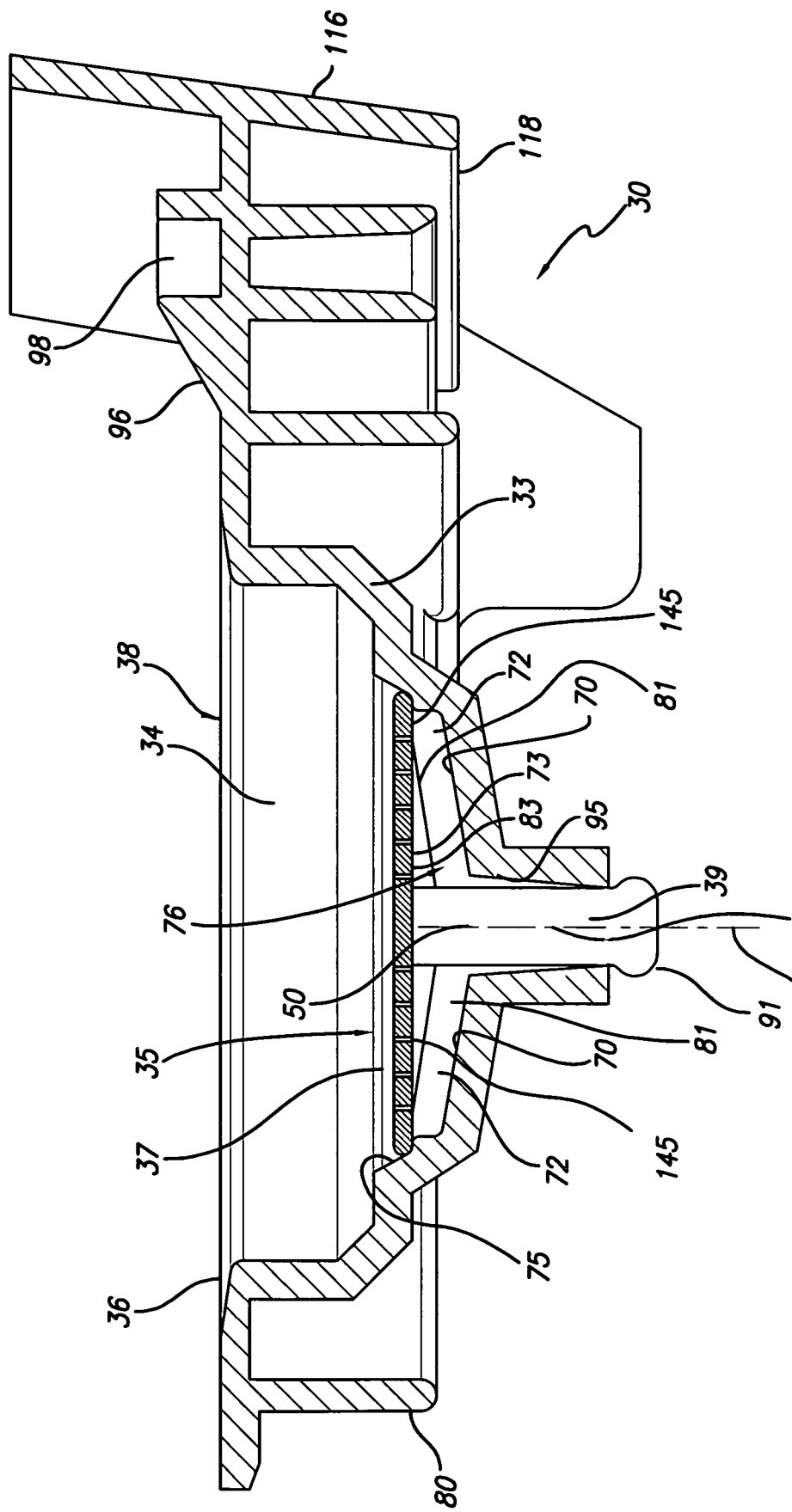
FIG. 3 is a cross-sectional view of the pod holder similar to that as shown in FIG. 2, and in which the holder has been removed from the brewer.

With further reference to FIGS. 2 and 3, the enlarged area 76 below the upper portion 37 of the insert 35 is generally open, thereby allowing generally free flow of liquid flowing through the holes 145. The open area facilitates pooling and mixing of the beverage as it drains into the drain area 74. The pooling and mixing of beverage as is being dispensed facilitates through mixing or blending of flavors prior to dispensing into the cup, thereby increasing the uniformity and consistency of the final beverage.

Additionally, the generally uniform and reinforced structure of the upper portion 37 of the insert 35 provides a uniform support for the pod. As such, there is a reduced chance for pooling or uneven infusion of the brewing substance. The holes 145 are generally dispersed over the open areas 85 in a generally uniform pattern to help further facilitate uniform extraction throughout the beverage brewing substance in the pod.

In the installed position as shown in FIG. 2 the holder 30 is positioned with the entry opening 38 in position to receive water for brewing. The entry opening 38 and cavity 34 are positioned below a sprayhead 40. Water 46 is provided by a water delivery system and enters an area 42 defined by the sprayhead 40. Water in the sprayhead area 42 flows through the holes 44 through the entry opening and into the cavity 34. Once the water has been dispensed into the area it mixes with the substance retained in the cavity 34 for producing a desired beverage. The beverage drains through a drain 74 for dispensing into the cup 28.

A locking and release assembly 60 can be provided. The assembly includes a release button or mechanism 90 a pin 92 which is selectively engageable with the holder 30 and a linkage 94 coupled to the release button 90 and the pin 92. In this configuration, operation of the release button 90 causes operation of the linkage 94 further operating on the pin 92. Operation of the button therefore causes operation of the pin to release the pin from the holder 30.

Figure 7:
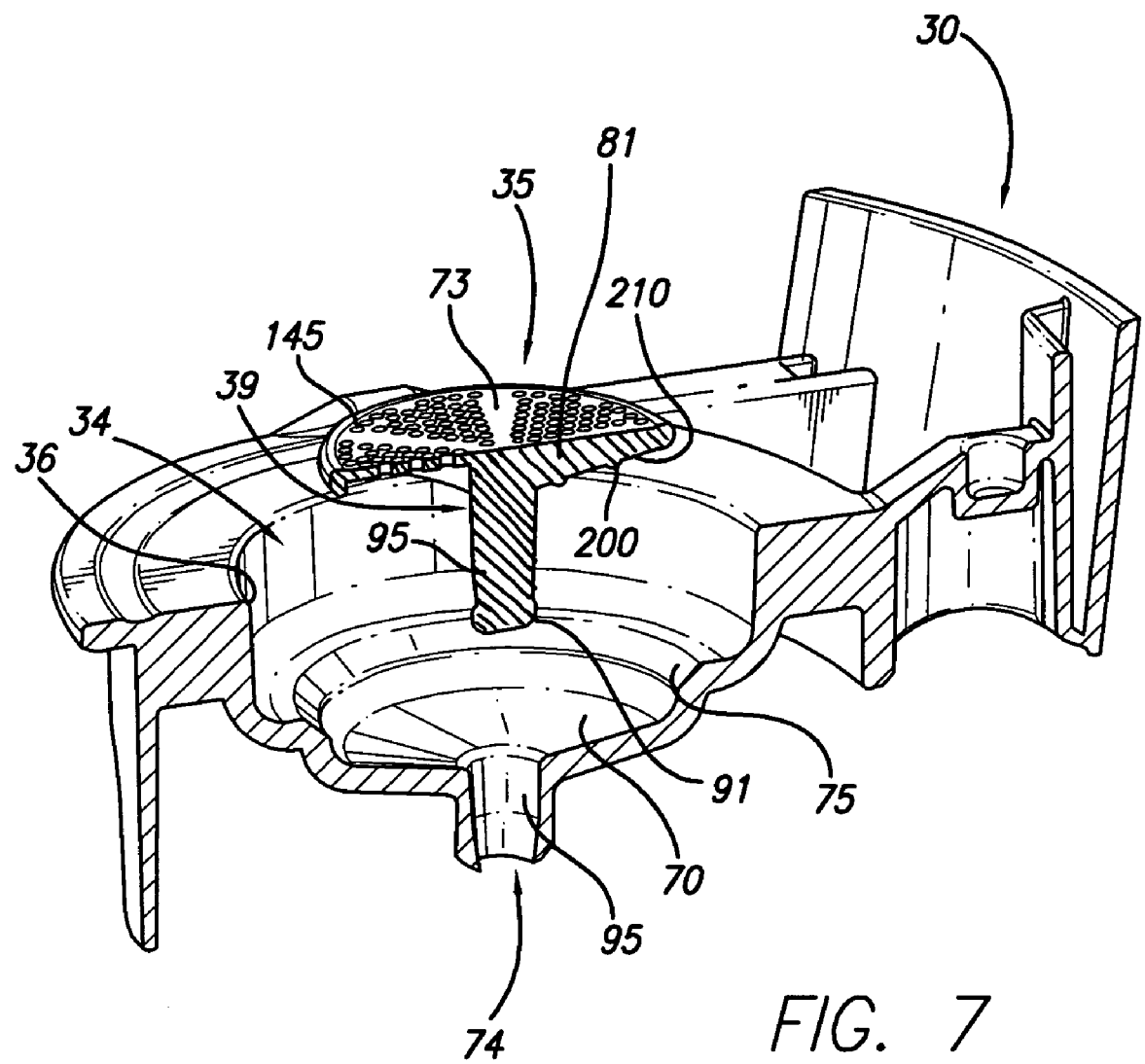
FIG. 7 is a perspective, cross-sectional view taken along line 2-2 showing an insert removed from the holder but positioned for engagement with the holder.
Figure 8:
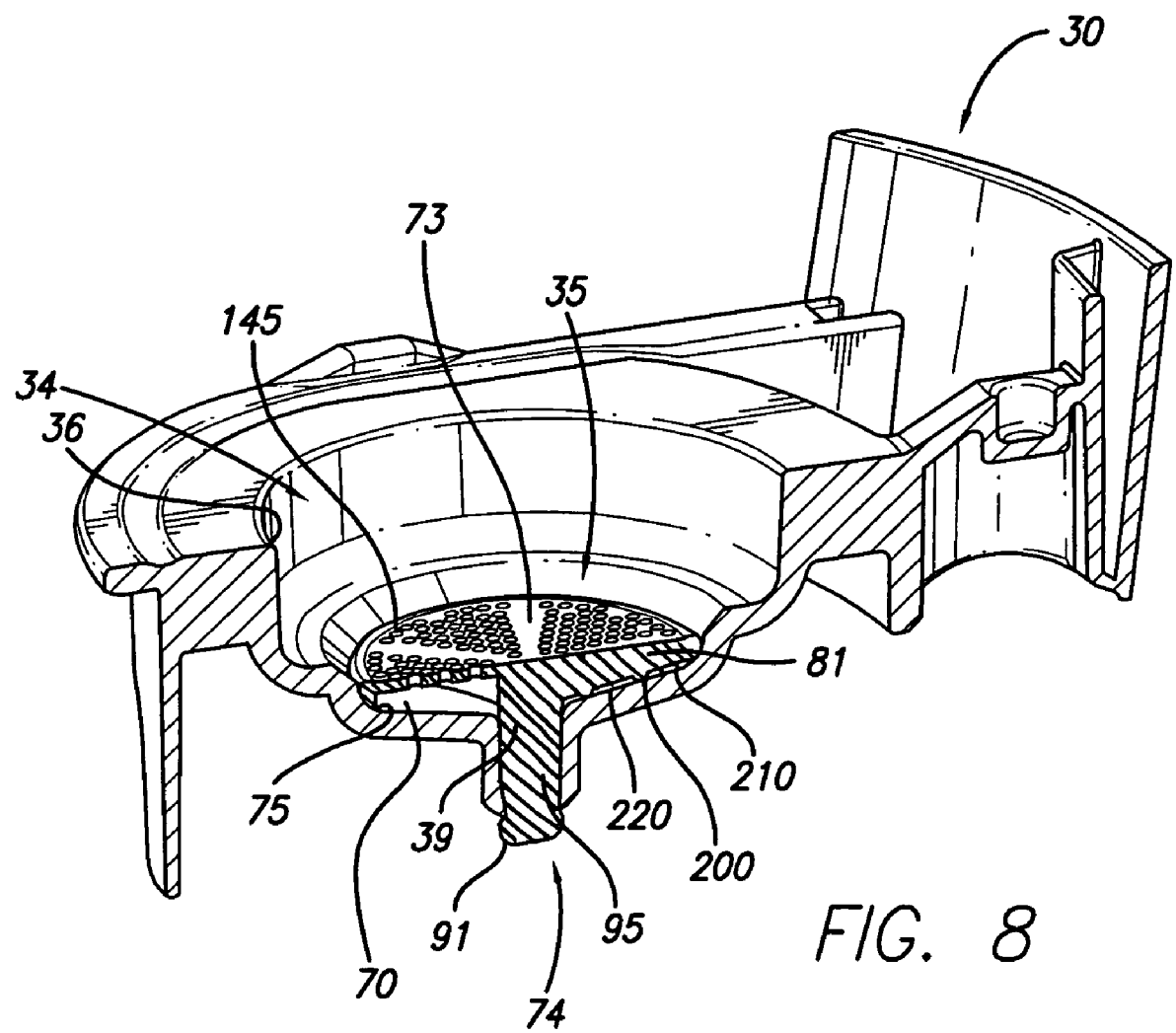
FIG. 8 is a perspective, cross-sectional view of the holder and insert with the insert engaged with the holder.

FIGS. 7 and 8 are additional perspective cross-sectional views of the holder 30 and insert 35 as disclosed. In FIG. 7, the insert 35 has been positioned away from the cavity and is shown in cross-section. In the cavity 34 and shown in cross-section. The extension 39 is shown for positioning in the drain 74.

In FIG. 8, the insert 35 has been axially engaged with the drain to allow the end 91 to extend through the drain and retain the insert 35 in place in the holder 30. In the embodiment as shown in FIG. 8, a particular embodiment of the insert 35 includes one or more protrusions 200 formed on a bottom edge 210 of the arms 81. The protrusions raise the bottom edge 210 of the arms 81 above the floor 70 to help facilitate further drainage of beverage from between the open areas 85. As such, beverage can pass from between the various open areas through voids 220 formed between the bottom side 210 of the arms and the topside of the floor 70.

Further details of the configuration and operation of the single-serving brewer 20 can be found in related provisional applications entitled "Apparatus, System and Method for Infusing a Pre-Packaged Pod filed Feb. 9, 2004 U.S. Provisional Application No. 60/543,370, "Apparatus System and Method for Retaining Beverage Brewing Substance" filed Feb. 6, 2004 U.S. Provisional Application No. 60/542,433, and "Brewer", Design Patent No. D511922, filed Feb. 10, 2004. Additional information relating to adjustable controlling the single-serving brewer 20 can be found in a related provisional application entitled "Adjustable Volume Brewer" filed Nov. 7, 2003, U.S. Provisional Application No. 60/518, 039. Additional information related to a spray head system and method for delivering water to the brewing assembly of the single-serving brewer 20 can be found in U.S. Provisional Application entitled "Water Delivery System, Method and Apparatus" filed Nov. 7, 2003, U.S. Provisional Application No. 60/518,411. Additional information related to beverage making apparatus which uses loose coffee and related devices and methods of use can be found in U.S. Provisional Application entitled "A Beverage Making Apparatus and Method Using Loose Beverage Substances" filed Apr. 2, 2004, U.S. Provisional Application No. 60/560,033. Information about a beverage making apparatus which uses loose coffee and related devices and methods of use can be found in U.S. Provisional Application entitled "A Beverage Making Apparatus and Method Using Loose Beverage Substance" filed Sep. 1, 2004, U.S. Provisional Application No. 60/606,233, U.S. application Ser. No. 11/101,321 entitled "Loose Coffee Apparatus System and Method" filed Apr. 7, 2005. U.S. Provisional Application No. 60/627,080 entitled "Loose Coffee Pod Apparatus, System And Method" filed Nov. 12, 2004; and U.S. Provisional Application No. 60/564,012 entitled "Pod Brewer Dry Plug Prevent System" filed Apr. 21, 2004. Each of the above-referenced applications and the materials set forth therein is incorporated herein in its entirety by reference.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as an illustration of certain embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily device their own implementations of the disclosure and associated methods that incorporate one or more of the features of the disclosure and fall within the spirit and scope of the present disclosure as set forth in the claims.

The invention claimed is:

1. A holder for use in a beverage maker,
the beverage maker including a body, a base and an upper portion generally extending from the body over the base,
the upper portion comprising a drawer,
the drawer comprising a holder releasably retainable on the upper portion of the beverage maker and retaining a beverage making substance for use in a beverage making process,
the holder including at least one wall, a floor extending from the wall, the wall and floor at least partially defining a cavity in the holder, a drain extending through the floor and communicating with the cavity,
an insert removably positionable in the holder for positioning a beverage making substance above at least a portion of the floor,
the insert having a unitary single piece construction having an upper portion and a single extension projecting from an underside of the upper portion, the upper portion having at least one liquid permeable portion for allowing beverage to flow from the brewing substance retained thereon,
the upper portion being removably positionable in the cavity and overlying at least a portion of the floor of the holder, the liquid permeable portion permitting the flow of fluid from a beverage substance from an area above the upper portion to the drain into a lower area of the cavity defined between the underside of the upper portion and the floor for allowing brewed beverage to flow through the liquid permeable portion of the upper portion and towards the drain in the floor,
the upper portion having a plurality of generally radially extending arms along the upper section extending from the single extension to the underside of the upper portion, openings defined between neighboring arms for providing holes through which beverage is drained;
the center of the single extension extending from the underside of the upper portion and extending axially through the drain for releasably engaging the holder, the single extension being dimensioned and positioned for extending into the drain generally along a central axis of the drain with an end extending from the drain spaced from the upper portion, the end being enlarged relative to the drain for engaging a rim on the outside of the drain, the extension having a blade shape having an elongated width dimension and a central axis extending coaxially with the central axis of the drain for promoting a columnate flow of beverage from the holder.

2. The holder of claim 1, the extension being dimensioned and positioned for extending into the drain with an end extending from the drain, the end being dimensioned for engaging the drain to create a releasable interference fit.

3. The holder of claim 1, the insert further comprising an upper portion and an extension, the upper portion positioned in the cavity and overlying at least a portion of the floor of the holder, the extension extending from the upper portion for releasably engaging the holder, the extension being dimensioned and positioned for extending into the drain with an end extending from the drain, the end being enlarged relative to the drain for engaging a rim of the drain.

4. The holder of claim 1, the insert further comprising an upper portion having openings extending through at least a portion of the upper portion, the openings at least permitting the flow of fluid from a beverage substance to the drain.

5. The holder of claim 4, the openings in the upper portion being generally vertically aligned relative to the holder.

6. The holder of claim 4, the openings in the upper portion being defined by a mesh material attached to the upper portion of the insert.

7. The holder of claim 6, mesh material being sized for use with a suitable beverage making substance.

8. The holder of claim 6, mesh material being sized for use with a suitable beverage making substance to retain a portion of the beverage making substance from flowing through the drain.

9. The holder of claim 4, the openings in the upper portion being defined by a mesh material molded into to the upper portion of the insert.

10. The holder of claim 4, the openings in the upper portion being defined by a mesh material adhesively attached to the upper portion of the insert.

11. The holder of claim 1 further comprising protrusions on a bottom side of the at least one arm for rising the bottom side of the arm off of the floor of the holder to facilitate the flow of beverage between the bottom side of the at least one arm and the floor.

12. The holder of claim 1 further comprising a locking and release assembly for locking and releasing the drawer with respect to the beverage maker.

13. The holder of claim 12 wherein the locking and release assembly comprises a release button operable to release the holder.

14. The holder of claim 1 wherein the drawer comprises a generally planar surface located to permit the drawer to be inverted and to knock the generally planar surface against another surface to dislodge a pod from the holder.

15. A holder for use in a beverage maker,
the beverage maker including a body, a base and an upper portion generally extending from the body over the base,
the upper portion comprising a drawer,
the drawer comprising a holder releasably retainable on the upper portion of the beverage maker and retaining a beverage making substance for use in a beverage making process,
the holder including at least one wall, a floor extending from the wall, the wall and floor at least partially defining a cavity in the holder, a drain extending through the floor and communicating with the cavity,
an insert removably positionable in the holder for positioning a brewing substance above at least a portion of the floor,
the insert a unitary single piece construction having including an upper portion and a single extension extending from an underside of the upper portion, the upper portion positioned in the cavity and overlying at least a portion of the floor of the holder, the single extension extending from the underside of the upper portion and extending generally coaxially with a central axis of the drain for releasably engaging the drain of the holder, the single extension being dimensioned and positioned for extending into the drain generally along a central axis of the drain with an end extending from the drain spaced from the upper portion, the end being enlarged relative to the drain for engaging a rim of the drain, the extension having a blade shape having an elongated width dimension and a central axis extending with the central axis of the drain for promoting a columnate flow of beverage from the holder, the upper portion having a plurality of generally radially extending arms along the upper section extending from the single extension to the underside of the upper portion, openings defined between neighboring arms for providing holes through which beverage is drained;

the openings at least permitting the flow of fluid from a beverage substance from an area above the upper portion to the drain into a lower area of the cavity defined between the underside of the upper portion and the floor for allowing brewed beverage to flow through the openings in the upper portion and towards the drain in the floor, the holes in the upper portion being generally vertically aligned relative to the holder.

16. The holder of claim 15, the holes in the upper portion being generally vertically aligned relative to the holder.

17. The holder of claim 15, the insert further comprising an upper portion having at least one arm generally radially extending along the upper portion, an open defined between neighboring arms for providing holes through which beverage is drained.

18. The holder of claim 15, further comprising protrusions on a bottom side of the at least one arm for rising the bottom side of the arm off of the floor of the holder to facilitate the flow of beverage between the bottom side of the at least one arm and the floor.

19. An insert for use in a beverage making substance holder of a beverage maker for use in a beverage making process, the beverage maker including a body, a base and an upper portion generally extending from the body over the base, the upper portion comprising a removable drawer, the drawer comprising a holder releasably retainable on the upper portion of the beverage maker for retaining a quantity of beverage making substance for use in the beverage making process, the holder including at least one wall, a floor extending from the wall, a wall and floor at least partially defining a cavity in a holder, a drain extending through the floor and communicating with the cavity, the insert being a unitary single piece construction configured for removable positioning in a holder for positioning a brewing substance above at least a portion of a floor, the insert comprising:

an upper portion and a single extension;

the upper portion positioned in the cavity and overlying at least a portion of a floor of a holder;

the single extension extending from the underside of the upper portion for releasably engaging a holder and extending generally coaxially through the drain generally along a central axis of the drain;

an end of the single extension extending beyond a rim of the drain and having a dimension greater than a corresponding dimension of the drain for engaging the rim of the drain for retaining the insert in the holder;

the single extension having a blade shape having an elongated width dimension and a central axis extending coaxially with the central axis of the drain for promoting a columnate flow of beverage from the drain of the holder;

the upper portion having a plurality of generally radially extending arms along the upper section extending from the single extension to the underside of the upper portion, openings defined between neighboring arms for providing holes through which beverage is drained;

the openings at least permitting the flow of fluid from a beverage substance from an area above the upper portion to the drain into a lower area of the cavity defined between the underside of the upper portion and the floor for allowing brewed beverage to flow through the openings in the upper portion and towards the drain in the floor.

20. The insert of claim 19, further comprising the upper portion having at least one arm generally radially extending along the upper section, an opening defined between neighboring arms for providing holes through which beverage is drained, and protrusions on a bottom side of the at least one arm for rising the bottom side of the arm off of a floor of a holder to facilitate the flow of beverage underneath the bottom side of the at least one arm.

21. A beverage maker including a substance holder for retaining a beverage making substance in a beverage making process, the beverage maker including a body, a base and an upper portion generally extending from the body over the base, the upper portion comprising a removable drawer, the drawer comprising a holder releasably retainable on the upper portion of the beverage maker, the holder including at least one wall, a floor extending from the wall, the wall and floor at least partially defining a cavity in the holder, a drain extending through the floor and communicating with the cavity, an insert removably positionable in the holder for positioning a brewing substance above at least a portion of the floor, the insert having a unitary single piece construction with an upper portion of the insert positioned in the cavity and overlying at least a portion of a floor of a holder, a single extension of the insert extending from the underside of the upper portion for releasably engaging a holder and extending generally coaxially through the drain generally along a central axis of the drain, the extension having a blade shape having an elongated width dimension and a central axis extending coaxially with the central axis of the drain for promoting a columnate flow of beverage from the holder, an end of the extension extending beyond a rim of the drain and having a dimension greater than a corresponding dimension of the drain for engaging the rim of the drain for retaining the insert in the holder, the upper portion having a plurality of generally radially extending arms along the upper section extending from the single extension to the underside of the upper portion, openings defined between neighboring arms for providing holes through which beverage is drained;

the openings at least permitting the flow of fluid from a beverage substance from an area above the upper portion to the drain into a lower area of the cavity defined between the underside of the upper portion and the floor for allowing brewed beverage to flow through the openings in the upper portion and towards the drain in the floor.

* * * * *